Jan. 3, 1939.  H. PELPHREY  2,142,285
HOB AND METHOD OF MANUFACTURE
Filed April 2, 1936  3 Sheets-Sheet 1
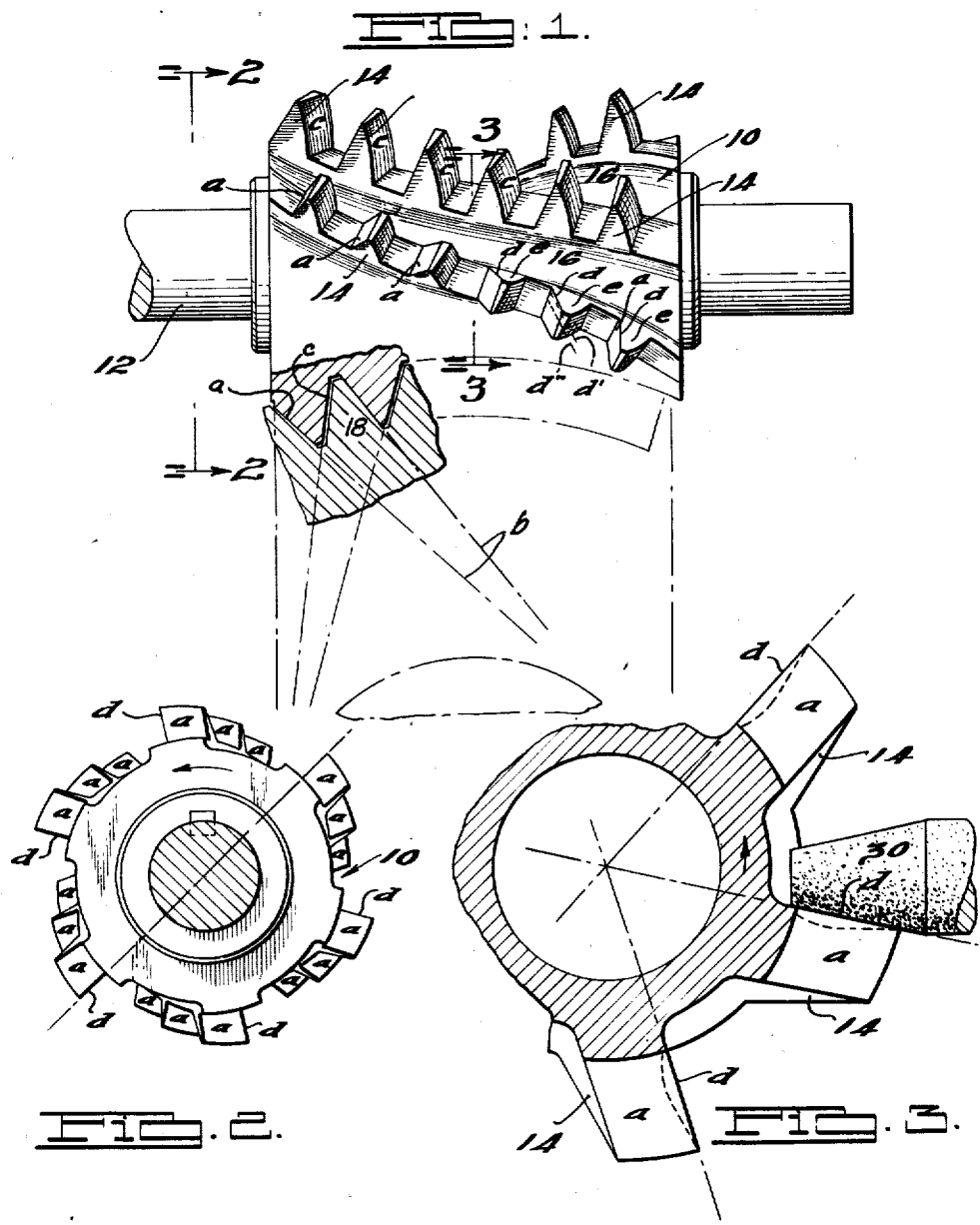
INVENTOR
Harry Pelphrey.
BY
Harness, Dickey, Pierce & Hann
ATTORNEYS.

Jan. 3, 1939. H. PELPHREY 2,142,285
HOB AND METHOD OF MANUFACTURE
Filed April 2, 1936 3 Sheets-Sheet 3
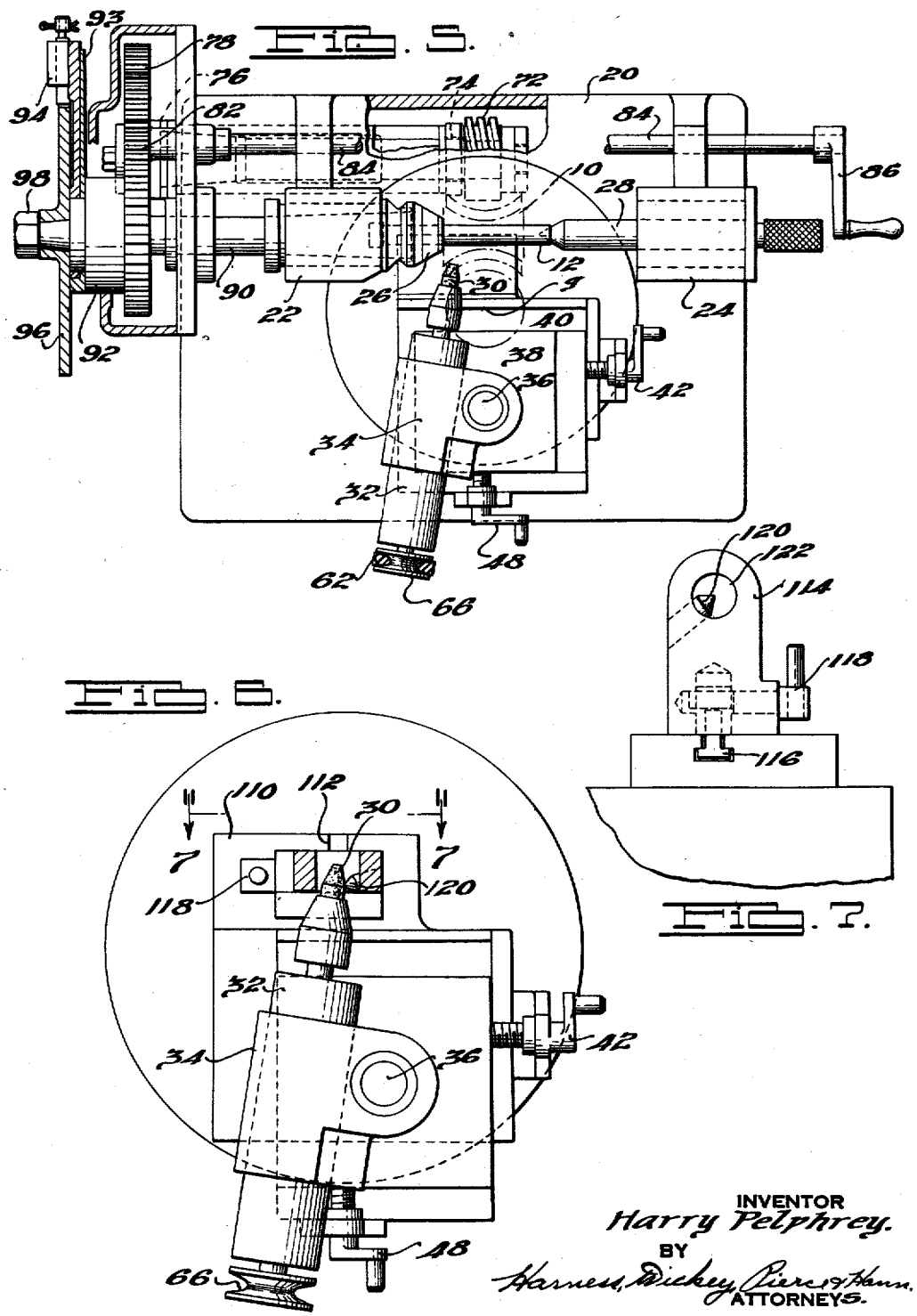
INVENTOR
Harry Pelphrey.
BY
Harness, Dickey, Pierce & Hann.
ATTORNEYS.

Patented Jan. 3, 1939

2,142,285

UNITED STATES PATENT OFFICE 2,142,285

HOB AND METHOD OF MANUFACTURE

Harry Pelphrey, Detroit, Mich., assignor to Michigan Tool Company, a corporation of Delaware Application April 2, 1936, Serial No. 72,239

11 Claims. (Cl. 51—278)

The present invention relates to gear cutting tools, and in particular provides an improved method and means for forming and sharpening hobs of the globoidal or Hindley types.

Objects of the present invention are to provide an improved method and means for manufacturing or re-sharpening hobs of the globoidal or Hindley type; to provide such a method and means whereby the cutting edges of the teeth of a globoidal or Hindley hob may be accurately cut to correct form by a single pass, or a plurality of duplicate passes, of a tool along the leading faces of the hob teeth; to provide such a method and means whereby in resharpening the hob, the machining or grinding action may be confined to the leading face of the hob teeth, no grinding of the flanks of the hob teeth being necessary; to provide such a method and means whereby the tool may be moved in a continuous path along the flutes between adjacent hob teeth, to thereby grind the leading faces of adjacent hob teeth and dress a cutting edge thereon.

Further objects of the present invention are to provide a method for fluting a hob to form a plurality of spaced cutting teeth thereon, and/or for re-sharpening the teeth so formed, which comprises machining or grinding the hob flutes to thereby dress a cutting edge on the leading face of each tooth, utilizing a tool, a cutting edge of which is disposed as a tangent to the base circle of the hob and lies in the mid-plane thereof; to provide such a method in which the tool is bodily moved relative to the hob in the mid-plane of the hob along an arcuate path the center of which arcuate path coincides with the center of the base circle of the worm; to provide such a method in which the arcuate bodily movement of the tool relative to the hob is accompanied by a rotation of the hob about the axis thereof, so that the hob flutes are helically disposed about the hob; and to provide such a method in which the helix of the hob fluting is so related to the helix of the hob teeth that the angle between one flank of each tooth and the leading face thereof is equal to or less than 90 degrees.

Further objects of the present invention are to provide an improved fixture for machining and grinding the leading faces of the teeth of a hob of the globoidal or Hindley type embodying means to support the hob, and further embodying means to move a tool in the mid-plane of the hob along an arcuate path of which coincides with the center of the base circle of the hob; to provide such a fixture in which the machining or grinding tool is so supported that at each point in said movement, said tool coincides with a tangent to the base circle of the hob; to provide such a fixture embodying means to effect a rotative movement of the hob in timed relation to said tool movement; to provide such a fixture in which the machining or grinding tool may comprise a pencil wheel and embodying improved means to drive the pencil wheel in rotation during said movement thereof.

With the above and other objects in view which appear in the following description, and in the claims appended hereto, a preferred but illustrative embodiment of the present invention is shown in the accompanying drawings, throughout the several views of which corresponding reference characters are used to designate corresponding parts and in which:

Fig. 1 is a view of a hob constructed in accordance with the present invention;

Fig. 2 is a view in end elevation taken along the line 2—2 of Fig. 1;

Fig. 3 is a view in vertical section, taken along the line 3—3 of Fig. 1;

Fig. 5 is a view in top plan of the machine in Fig. 4;

Fig. 6 is a fragmentary view of a fixture for dressing the grinding tool which may be used with the machine of Figs. 4 and 5; and Fig. 7 is a detailed view taken along the line 7—7 of Fig. 6.

Figure 4:
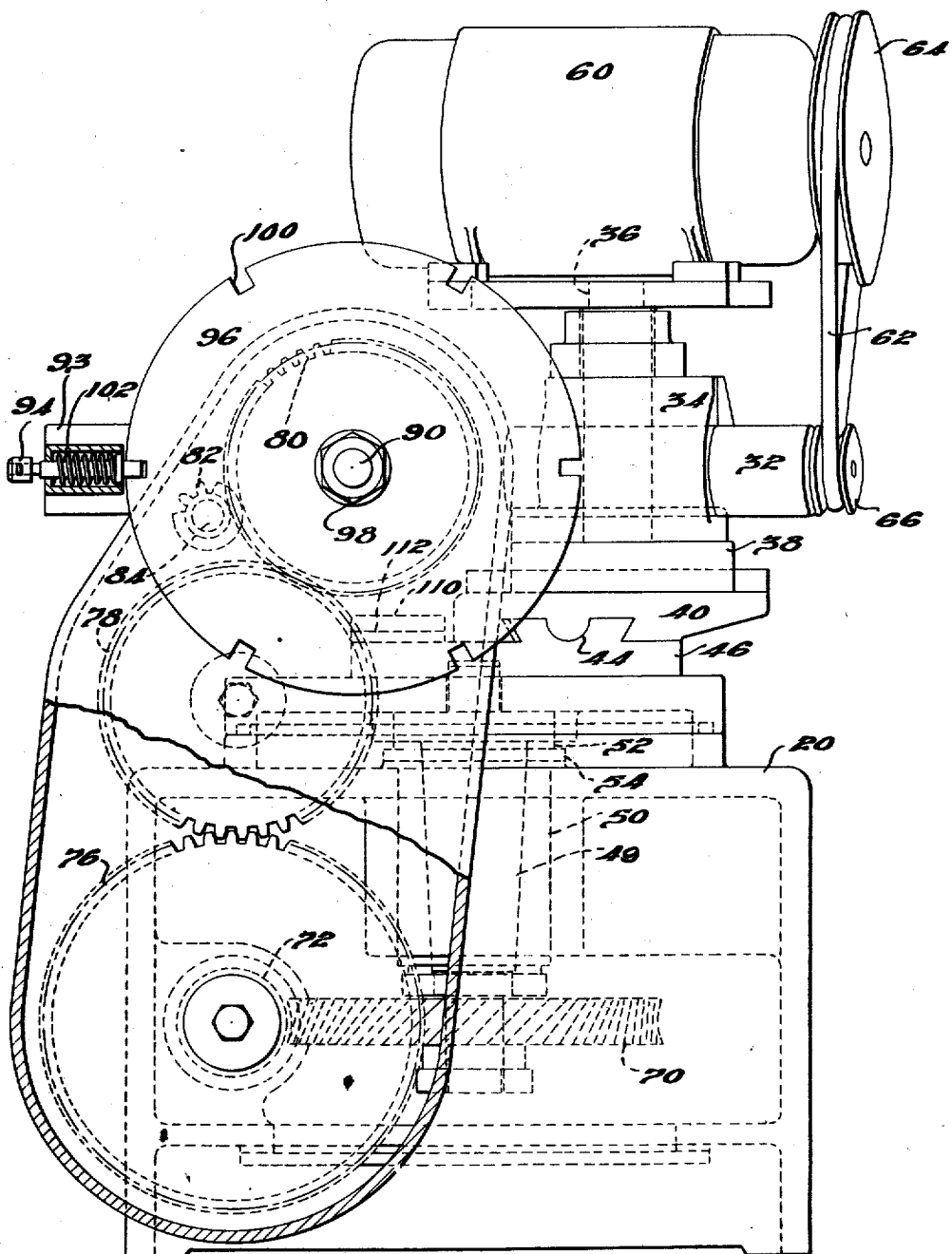
Fig. 4 is a view in elevation of a preferred construction of the fixture of the present invention.

In its broader aspects, the present invention relates generally to the manufacture as well as to the resharpening of hobs of the globoidal or Hindley types; that is, hobs designed for use in the cutting of the worm wheels or worm gears of gear sets embodying the Hindley or globoidal principle. In a narrower sense, the present invention is directed principally to the provision of an improved method and fixture for re-grinding or sharpening the cutting edges of the teeth of hobs designed to cut worm wheels for such gear sets. United States Patent No. 2,026,215 granted December 31, 1935, to Samuel I. Cone describes and claims a globoidal hob to which the improvements of the present invention are particularly applicable.

As described in detail in the Cone patent, globoidal hobs for forming globoidal worm wheels are characterized in that in the mid-plane of the hob each tooth face is rectilinear, and that lines drawn in the mid-plane as extensions of the tooth faces of the helical thread of the hob all lie tangent to a common circle, which circle may be called the base circle of the hob and the axis of which circle coincides with the axis of a worm wheel of mating capacity with and positioned at correct center distance from the hob. In accordance with usual practice, the hob thread is fluted at a plurality of points around the circumference to the hob, to thereby form a plurality of spaced cutting teeth, a leading edge of each of which is dressed to provide a cutting edge. Preferably also as disclosed in the Cone patent, the flanks of the hob teeth are relieved rearwardly from the leading face thereof, the relieved surface being a helix of lesser pitch than the helix of the thread, but preserving the above stated rectilinear and tangential relation to the base circle. An improved machine for providing the helical relief to the hob teeth is described and claimed in Patent No. 1,980,444 granted November 13, 1934, to George R. Scott.

In further accordance with the disclosure of the above Cone patent, the hobbing is preferably accomplished in two steps, including a roughing step and a finishing step. The entire finishing step is effected while the hob and worm wheel are on correct center distances, and any feeding between the hob and the worm wheel during the finishing is accomplished by rotatively advancing the hob relative to the worm wheel. To accommodate the initial movement of the finishing hob to correct center distance from the worm wheel, the teeth of the finishing hob are thinner than required for full mating capacity with the worm wheel. One leading edge of each hob tooth thus remains inactive.

The two hobbing steps are preferably also employed in the practice of the present invention, the present hob being particularly designed to effect the finishing step, although, as will appear from a complete understanding thereof, it may also be used for the roughing step. Thus, the hob teeth are thinner than required for full mating contact with the wheel.

In the preferred practice of the present invention one edge only of each hob tooth is dressed to a cutting edge, the other edge, being inactive, not being required to be so dressed. A complete finishing operation is thus conducted in two steps, the first step serving to finish one flank of each wheel tooth and the subsequent step, effected by inverting the hob, serving to finish the remaining flank of each wheel tooth. Either edge may be selected as the cutting edge, and the improved fixture hereinafter described is selectively adjustable to correspond to the cutting edge selected.

Referring in detail to Figs. 1 to 3, the hob 10 which may be supported upon an arbor 12 in the usual way, is provided with a plurality of cutting teeth 14, which are helically disposed about the hob body and which are separated by helically extending flutes 16. The lefthand flank a of each tooth 14 is generated in helically relieved relation to the main thread helix, in accordance with the teachings of the above identified Cone patent, that is, so that extensions thereof lying in the mid-plane of the hob all fall tangent to the base circle of the hob. Such tangents are indicated in dotted lines in Fig. 1 and designated b. The righthand tooth faces c are preferably similarly generated although this relation is not essential since, as described above hob 10 is specifically designed for the finishing step, and, as clearly appears in the sectionally illustrated mid-plane portion of Fig. 1, the hob teeth 14 are each somewhat thinner than the spacing between the teeth 18 of the worm wheel.

Being inactive, the form of the righthand faces c is not important, it being only necessary to provide sufficient clearance between them and the adjacent faces of the worm wheel teeth. The cutting edges of the hob teeth 14 are designated d, and are formed by the junction between the leading faces e thereof and the lefthand flanks a thereof.

In accordance with the present invention all cutting operations are effected entirely by machining or grinding away the leading tooth faces e, no cutting being required on the flanks a. For this reason the cutting edges d after each sharpening operation are progressively moved rearwardly of the associated tooth as indicated by the dotted lines d', d'', etc. In thus retiring the cutting edge d, however, it is necessary that each new cutting edge d', d'', etc. conform in configuration to a corresponding part of the main helix of the hob thread. Since the working flanks a are relieved along a helix of lesser pitch than such main helix, this conformation occurs only if the cutting edges d, d' and d'' are radially disposed, it being characteristic, as previously noted, that the main and relieved helices are radially rectilinear. Each hob tooth 14 is thus characterized as having a rearwardly helically relieved flank a and a linear radially disposed cutting edge d.

As further disclosed in the above identified Cone patent, it is desirable that the flutes 16 which space the respective teeth 14, be helically disposed about the hob in order to avoid the formation of interior angles at the cutting edges d which exceed 90 degrees. Preferably the helix angle of flute 16 is such that the angle included within each tooth between the forward face e thereof and the main thread helix of the hob is substantially 90 degrees. The relief angle is preferably of the order of 10 degrees, so that the resultant angle included within each tooth between the relieved flank a thereof and the leading face e thereof is of the order of 80 degrees.

In accordance with the present invention, the initial cutting of the flutes 16, as well as the cutting away of the leading faces e to effect a re-sharpening of the cutting edges d of each row of teeth may be and preferably is effected in a single continuous pass, or a plurality of duplicate passes, across the leading faces e from one end of the hob to the other of a tool having a rectilinear cutting surface. The cutting surface of the tool is preferably co-extensive in length with each cutting edge, and the tool is so disposed that the cutting edge is radial to the hob. To preserve the radial relation of the tool cutting edge to the hob, the movement of the tool axially of the hob is accompanied by timed relative rotation between the hob and the tool. To preserve the rectilinear form of each cutting edge, the tool is so disposed relative to the hob that at each point in its movement axialy of the hob, it coincides with a tangent to the base circle of the hob. Thus, in moving along each flute 16, the linear cutting edge of the tool, cuts a linear cutting edge d, d', d'', etc. on each hob tooth 14, which is linear and is tangential to the hob base circle.

Referring now to Figs. 4 and 5, the fixture comprises generally a base structure 20, upon which a head stock 22 and a tail stock 24 are disposed. The hob 10 to be sharpened is carried upon the arbor 12 between the driving center 26 and the dead-center 28 associated with stocks 22 and 24 respectively. The tool 30 is illustrated as a rotatably mounted abrasive pencil wheel; it will, however, be understood that the pencil wheel is illustrative only of any of a variety of different types of tools which may be utilized to suitably form or dress the leading tooth surfaces by a grinding, cutting, or other suitable action. It will further be understood that the term "tool" in the present specification and in the claims is used in a correspondingly generic sense. The wheel 30 is carried in a bearing member 32, which bearing member is adjustably suported within a split bracket 34. Bracket 34 in turn is pivotally secured in adjustable relation upon a post 36, which is carried by a slide 38. Slide 38 rides in suitable ways formed in a second slide 40 and is adjustable therealong by conventional lead screw mechanism 42. Slide 40 rides in ways 44 formed in a rotatable table structure 46, and is adjustable therealong by conventional lead-screw mechanism 48. Table 46 is provided with a downwardly extending drive spindle 49 provided with suitable bearings 50 formed in the machine frame 20, and is supported in suitably elevated relation to table 20 by one or more bearing washers 52 which are disposed between the underside of the rotatable table 46 and an upwardly extending frame boss 54. Rotation of table 46 thus causes bodily movement of the slides 40 and 38 and consequently of the pencil wheel 30. Spindle 49 is so located, that the center of the just stated bodily rotation of wheel 30 coincides with the center of the base circle of the hob 10. This center is designated g in Fig. 5. The radial spacing between the center g of bodily rotation of wheel 30 and the axis of axial rotation thereof is accurately adjustable by suitable adjustment of the position of slide 38, and by rotation of bracket 34 about post 36, to correspond exactly to the radius of the base circle of the hob 10. Wheel 30, accordingly, coincides at all points in its bodily rotation to a tangent to the base circle. The active end of wheel 30 is tapered, and to render the upper tapered surface thereof radial with respect to hob 10, wheel 30 is supported with the tapered edge sufficiently below the axis of hob 10 to compensate for the taper. The tapered portion of pencil wheel 30 is sufficiently long that an entire leading face e of a hob tooth may be dressed thereby during operation.

With this arrangement, it will be appreciated that as wheel 30 is bodily rotated by table 46 and thus travels from the one end of hob 10 to the other, the active working face of wheel 30 is always disposed radially of the hob and in each bodily rotative position of wheel 30, it coincides with a tangent to the base circle of the hob. As the pencil wheel travels along and engages a cutting edge of a hob tooth, the cutting edge is engaged simultaneously from end to end and the resultant new edge cut by the pencil wheel is also a straight line.

The axial rotation of wheel 30 is effected by a motor 60, also adjustably supported upon the previously mentioned post 36, through a belt 62, which is trained around motor pulley 64 and a second pulley 66 secured upon the outer end of the shaft of wheel 30.

In order to effect the bodily rotation of wheel 30, the lower end of spindle 49 is provided with a worm wheel 70, which meshes with and is driven by a worm 72, the shaft 74 of which is suitably supported in the machine frame. At its outer end shaft 74 carries a pinion 76, which meshes with and is driven by an idler gear 78. Idler gear 78 in turn meshes with and is driven by a gear 80. Gear 80 in turn meshes with and is driven by a pinion 82 supported in the machine frame upon a shaft 84, which may be driven in any suitable way, a crank handle 86 being illustrated.

Gear 80 is loosely carried upon the spindle 90 associated with the driving center 26 for hob 10, and is provided with a hub 92 which is selectively connectible by a detent 94 carried by a hub bracket 93 to an indexing wheel 96. Indexing wheel 96 is removably secured by a nut 98 upon the outer end of the spindle 90 in driving relation thereto.

Indexing wheel 96 is provided with a plurality of notches 100 on its periphery, equi-angularly spaced from each other and the number of which corresponds to the number of flutes on the hob 10. Detent 94 is retractible against the force of a biasing spring 102 associated therewith, and so may be retracted from any of the notches 100, to permit free rotation of indexing wheel 96 with respect to gear 80.

With the above described driving relation it will be understood that rotation of shaft 84 rotates hob 10 through spindle 90, index wheel 96, detent 94 and gears 80 and 82. Such rotation effects corresponding rotation of table 46 and consequently causes bodily rotation of wheel 30 through gears 82, 78, 76 and 70. It will be understood that the gearing relation is such that a rotation of hob 10 in a clockwise direction as viewed in Fig. 4 is accompanied by movement of the wheel 30 from the lefthand end thereof towards the righthand end of hob 10 as viewed in Fig. 5. It will also be understood that the gearing relation is such that the helical path traced by wheel 30 across the hob 10 corresponds to the helix of the flutes.

Considering the operation of the machine as a whole, after preliminarily disposing a hob 10, requiring either to be initially dressed or to be re-sharpened, between the centers 26 and 28, the crank 86 may be turned until the pencil wheel 30 is slightly to the left (Fig. 5) of the position to be occupied by the lefthand tooth of a given row on hob 10. Hob 10 may then be disposed between centers 26 and 28 with the edge d of such tooth below the level of the upper surface of pencil 30 a distance determined by the amount of stock which it is desired to remove from the face of the tooth.

Following the above described preliminary adjustments, motor 60 may be started in any suitable way, placing wheel 30 in axial rotation at a relatively high rate. Crank 86 may then be operated to cause hob 10 to rotate axially and to cause the linear grinding face of wheel 30 to move bodily in an arcuate path, sweeping across the successive forward faces e of the teeth 14 of hob 10, the combined rotation of hob 10 and translation of wheel 30 resulting in a helical movement of wheel 30 with respect to hob 10. Since each tooth 14 presents a straight line which may be extended to form a tangent to the base circle, and since the cutting surface of wheel 30 is radial of hob 10 and tangential to the base circle, it will be appreciated that as wheel 30 advances and engages the teeth 14, all points along each such straight line are engaged simultaneously, and the grinding action is not affected by the helical travel of wheel 30 relative to hob 10. The new cutting d, d', d'', etc. thus formed is a true straight line, radial of the hob and tangential to the base circle. The combined rotation and translation of wheel 30 relative to hob 10 prevents the grinding of a straight line cutting edge on the opposite side of each tooth face, but such action is of no importance since as previously stated, it is intended that such opposite cutting edge shall be inactive.

After completing the dressing of one row of cutting edges it will be appreciated that detent 94 may be retracted, permitting rotation of spindle 90 and consequently of hob 10 relative to the wheel 30, bringing another row of teeth into position to be re-ground. The complete re-grinding or re-sharpening action may thus be effected in a succession of operations corresponding in number to the number of flutes on the hob 10 and each thereof being effected by the continuous movement of the pencil wheel across the tooth faces, the re-sharpening action being confined entirely to the forward faces of the hob teeth.

As previously stated either edge of each hob tooth may be selected as the cutting edge. To accommodate the above described fixture to re-grind an opposite edge of each tooth, it will be appreciated that it is only necessary to move pencil wheel 30 to the opposite side of the axis of bodily rotation thereof, and to suitably adjust its angular position by rotating it about post 36 and suitably adjusting slide 38 to cause the axis of wheel 30 to coincide with tangents drawn to the opposite side of the base circle.

Similarly, the fixture may be adjusted, by raising the elevation of wheel 30, to act from a position above each tooth face instead of from a position therebelow.

To illustrate the universality of the fixture, Figs. 1, 2 and 3 are drawn to illustrate the grinding as applied to the lefthand edges of the hob, with wheel 30 disposed above the level of the teeth, in which instance wheel 30 would be disposed coincident with the dotted tangents b. Figs. 4 and 5 are shown with the fixture adjusted to operate with the wheel 30 acting from the underside of the teeth and to accommodate hob 10 of Figs. 1, 2 and 3 in an end-for-end inverted position.

Referring to Figs. 6 and 7, the table 46 is preferably provided with an extension 110 at the rear end thereof provided with a rearwardly open T-slot 112, to receive and support a dressing fixture 114. Fixture 114 is provided with a stud 116 movable by conventional locking mechanism 118 to a position in locking engagement with the slot 112 or to a position in which fixture 114 may be slid rearwardly of the machine and disengaged from the extension 110. With this arrangement, it will be understood that in the normal operation of the machine, fixture 114 is removed from the extension, but that when no hob is positioned in the machine, fixture 114 may be secured in place relative to wheel 30 for the purpose of dressing the cutting edge thereof. The dressing element of fixture 114 comprises a conventional cutting tool 120 secured in the axial opening 122 of the fixture, and disposed to engage the face of wheel 30 during rotation of the latter. By turning wheel 30 about post 36 to bring the tapered face thereof parallel to the path of slide 38, and advancing it axially by means of lead screw 48, a tapered working surface may be dressed upon the ends of wheel 30.

Although specific embodiments of the present invention have been described, it will be appreciated that various modifications may be made in the form, number and arrangement of parts of the fixture for effecting the re-sharpening or initial manufacture of the hob. It will also be understood that the improved method of the present invention may be practiced in ways other than the specific embodiment described. The foregoing disclosure of the improved hob, the improved method and the improved fixture are, accordingly, to be regarded in an illustrative and not in a limiting sense.

What is claimed is:

1. The method of forming cutting edges on the teeth of a hob of the globoidal type having a helically disposed thread fluted angularly to the thread helix, which comprises moving a tool about an axis coincident with the axis of the base circle of the hob relative to the hob across the hob tooth faces, said tool movement being maintained in the mid-plane of the hob; and effecting axial rotation of said hob relative to said tool in timed relation to said first mentioned movement.

2. The method of forming cutting edges on the tooth of a globoidal hob having a helically disposed thread fluted angularly of said helix, which includes disposing a tool in parallel relation to a tangent to the base circle of said hob, effecting bodily relative movement between said hob and said tool about an axis which coincides with the center of said base circle, and effecting axial rotation of said hob relative to said tool in timed relation to said bodily movement.

3. The method of forming cutting edges on the teeth of a globoidal hob having a plurality of teeth disposed helically of the hob, each of said teeth being provided with a helically relieved working flank which includes disposing a tool in coincidence with a tangent to the base circle of said hob, effecting relative bodily movement between said hob and said tool about an axis which coincides with the center of said base circle, and effecting axial rotation of said hob relative to said cutting tool in timed relation to said bodily movement.

4. Mechanism for forming cutting edges on the teeth of a globoidal hob having a helically disposed thread fluted angularly to said thread helix, comprising, in combination, means for supporting said hob; means for supporting a tool in cutting relation to the teeth of said hob parallel to a tangent to the base circle thereof; means for effecting relative movement between said first and second means to cause relative bodily movement between said tool and said hob about an axis which coincides with the center of said base circle; and additional means for causing axial rotation of said hob relative to said tool in timed relation to said bodily movement.

5. Mechanism for forming cutting edges on the teeth of a globoidal hob having a helically disposed thread fluted angularly to said thread helix, said fluting forming the leading faces of said teeth, comprising, in combination, means for supporting a hob; means for supporting a cutting tool in coincidence with a tangent to the base circle of said hob; means adapting said first and second means to cause relative bodily movement between said hob and said cutting tool about an axis which coincides with the axis of said base circle to cause said tool to traverse said leading faces; and additional means for effecting axial rotation of said hob relative to said cutting tool in timed relation to said bodily movement.

6. Mechanism for forming cutting edges on the teeth of a globoidal hob having a helically disposed thread, fluted angularly to said thread helix at a plurality of points around the circumference of said hob comprising, in combination, means for supporting said hob for rotation about the axis thereof; means for supporting a cutting tool in coincidence with the tangent to the base circle of said hob for bodily movement in the mid-plane of said hob about an axis which coincides with the center of said base circle; means for rotating said hob and bodily moving said tool in timed relation; and indexing means for changing the rotative position of said hob relative to said cutting tool.

7. Mechanism for forming cutting edges on the teeth of a globoidal hob having a helically disposed thread, fluted angularly to said thread helix, said fluting forming the leading faces of said teeth, comprising, in combination, means for supporting said hob; a tool supporting table rotatable about an axis coincident with the center of the base circle of said hob to cause said tool to traverse said leading faces; and means for supporting said tool on said table, said last named means being adjustable to position said cutting tool in coincidence with a tangent to either side of said base circle.

8. The method of forming cutting edges on the teeth of a globoidal hob, said teeth being in helical continuity and being spaced circumferentially of the hob by flutes which extend axially of the hob and define the leading faces of the hob teeth, said cutting edges being constituted by the junction between the leading face of each tooth and the flank thereof, which includes disposing a tool in coincidence with a tangent to the base circle of said hob and effecting relative bodily movement between said hob and said tool about a center which coincides with the axis of said base circle to cause said tool to traverse said leading faces.

9. Mechanism for forming cutting edges on the teeth of a globoidal hob, said teeth being in helical continuity and being spaced circumferentially of the hob by flutes which extend axially of the hob and define the leading faces of the hob teeth, comprising in combination, means for supporting said hob; means for supporting a tool in cutting relation to the teeth of said hob and coincident with a tangent to the base circle thereof; and means for effecting relative movement between said first and second means to cause said tool to traverse said leading tooth faces of said hob, said movement occurring about an axis which coincides with the center of said base circle.

10. The method of forming cutting edges on the teeth of a globoidal hob, said teeth being in helical continuity and being spaced circumferentially of the hob by flutes which extend axially of the hob and define the leading faces of the hob teeth, said cutting edges being constituted by the junction between the leading face of each tooth and the flank thereof, which comprises effecting bodily relative movement between said hob and a cutting tool about an axis coincident with the axis of the base circle of the hob to cause said cutting tool to dress the leading faces of the hob teeth, and maintaining said relative cutting tool movement in a plane which includes the axis of the hob.

11. The method of forming cutting edges on the teeth of a globoidal hob, said teeth being in helical continuity and being spaced circumferentially of the hob by flutes which extend axially of the hob and define the leading faces of the hob teeth, said cutting edges being constituted by the junction between the leading face of each tooth and the flank thereof, which comprises bodily moving a cutting tool about an axis coincident with the axis of the base circle of the hob across the leading face of a said tooth, and maintaining said cutting tool movement in the mid-plane of the hob.

HARRY PELPHREY.

---

CERTIFICATE OF CORRECTION.

Patent No. 2,142,285.                  January 3, 1939.

HARRY PELPHREY.

It is hereby certified that error appears in the printed specification of the above numbered patent requiring correction as follows: Page 2, first column, line 9, for the word "to" first occurrence, read of; page 4, second column, line 24, claim 2, for "tooth" read teeth; and that the said Letters Patent should be read with this correction therein that the same may conform to the record of the case in the Patent Office.

Signed and sealed this 7th day of March, A. D. 1939.

Henry Van Arsdale.

(Seal)                                    Acting Commissioner of Patents.

6. Mechanism for forming cutting edges on the teeth of a globoidal hob having a helically disposed thread, fluted angularly to said thread helix at a plurality of points around the circumference of said hob comprising, in combination, means for supporting said hob for rotation about the axis thereof; means for supporting a cutting tool in coincidence with the tangent to the base circle of said hob for bodily movement in the mid-plane of said hob about an axis which coincides with the center of said base circle; means for rotating said hob and bodily moving said tool in timed relation; and indexing means for changing the rotative position of said hob relative to said cutting tool.

7. Mechanism for forming cutting edges on the teeth of a globoidal hob having a helically disposed thread, fluted angularly to said thread helix, said fluting forming the leading faces of said teeth, comprising, in combination, means for supporting said hob; a tool supporting table rotatable about an axis coincident with the center of the base circle of said hob to cause said tool to traverse said leading faces; and means for supporting said tool on said table, said last named means being adjustable to position said cutting tool in coincidence with a tangent to either side of said base circle.

8. The method of forming cutting edges on the teeth of a globoidal hob, said teeth being in helical continuity and being spaced circumferentially of the hob by flutes which extend axially of the hob and define the leading faces of the hob teeth, said cutting edges being constituted by the junction between the leading face of each tooth and the flank thereof, which includes disposing a tool in coincidence with a tangent to the base circle of said hob and effecting relative bodily movement between said hob and said tool about a center which coincides with the axis of said base circle to cause said tool to traverse said leading faces.

9. Mechanism for forming cutting edges on the teeth of a globoidal hob, said teeth being in helical continuity and being spaced circumferentially of the hob by flutes which extend axially of the hob and define the leading faces of the hob teeth, comprising in combination, means for supporting said hob; means for supporting a tool in cutting relation to the teeth of said hob and coincident with a tangent to the base circle thereof; and means for effecting relative movement between said first and second means to cause said tool to traverse said leading tooth faces of said hob, said movement occurring about an axis which coincides with the center of said base circle.

10. The method of forming cutting edges on the teeth of a globoidal hob, said teeth being in helical continuity and being spaced circumferentially of the hob by flutes which extend axially of the hob and define the leading faces of the hob teeth, said cutting edges being constituted by the junction between the leading face of each tooth and the flank thereof, which comprises effecting bodily relative movement between said hob and a cutting tool about an axis coincident with the axis of the base circle of the hob to cause said cutting tool to dress the leading faces of the hob teeth, and maintaining said relative cutting tool movement in a plane which includes the axis of the hob.

11. The method of forming cutting edges on the teeth of a globoidal hob, said teeth being in helical continuity and being spaced circumferentially of the hob by flutes which extend axially of the hob and define the leading faces of the hob teeth, said cutting edges being constituted by the junction between the leading face of each tooth and the flank thereof, which comprises bodily moving a cutting tool about an axis coincident with the axis of the base circle of the hob across the leading face of a said tooth, and maintaining said cutting tool movement in the mid-plane of the hob.

HARRY PELPHREY.

---

CERTIFICATE OF CORRECTION.

Patent No. 2,142,285.  January 3, 1939.

HARRY PELPHREY.

It is hereby certified that error appears in the printed specification of the above numbered patent requiring correction as follows: Page 2, first column, line 9, for the word "to" first occurrence, read of; page 4, second column, line 24, claim 2, for "tooth" read teeth; and that the said Letters Patent should be read with this correction therein that the same may conform to the record of the case in the Patent Office.

Signed and sealed this 7th day of March, A. D. 1939.

Henry Van Arsdale.

(Seal)  Acting Commissioner of Patents.